US012510166B1

(12) United States Patent
Liao et al.

(10) Patent No.: US 12,510,166 B1
(45) Date of Patent: Dec. 30, 2025

(54) BLAST GATE CAPABLE OF PREVENTING GATE-DROPPING (71) Applicant: Hui-Chuan Liao, Oakland, CA (US)

(72) Inventors: Hui-Chuan Liao, Oakland, CA (US); Yu-Chen Hsiao, Taichung (TW)

( * ) Notice: Subject to any disclaimer, the term of this patent is extended or adjusted under 35 U.S.C. 154(b) by 0 days.

(21) Appl. No.: 18/907,027

(22) Filed: Oct. 4, 2024

(51) Int. Cl.
F16K 3/02 (2006.01)
A47L 9/24 (2006.01)
F16K 27/04 (2006.01)
A47L 7/00 (2006.01)
B08B 15/04 (2006.01)
F16K 3/312 (2006.01)
F16K 3/32 (2006.01)
F16K 31/08 (2006.01)

(52) U.S. Cl.
CPC ............ F16K 3/0281 (2013.01); A47L 9/248 (2013.01); F16K 27/044 (2013.01); A47L 7/0095 (2013.01); A47L 9/242 (2013.01); B08B 15/04 (2013.01); F16K 3/312 (2013.01); F16K 3/32 (2013.01); F16K 31/084 (2013.01)

(58) Field of Classification Search
CPC .......... F16K 3/0281; F16K 3/32; F16K 3/312; F16K 27/044; F16K 31/084; A47L 9/248; A47L 9/242; A47L 7/0095; B08B 15/04; B08B 15/00
USPC ......................................... 251/329, 65, 326
See application file for complete search history.

(56) References Cited

U.S. PATENT DOCUMENTS

| 3,353,786 | A  | * | 11/1967 | Combes ................ | F16K 27/044 251/329 |
| 3,722,857 | A  | * | 3/1973 | Townsend ............. | F16K 3/0281 251/328 |
| 4,051,863 | A  | * | 10/1977 | Still ...................... | F16K 3/0227 137/454.2 |
| 8,074,962 | B1 | * | 12/2011 | Krohmer ............... | F16K 27/044 251/146 |
| 8,091,194 | B2 | * | 1/2012 | Clatot .................... | G21F 7/005 29/243.57 |
| 8,534,309 | B2 | * | 9/2013 | Metzger ................ | F16K 27/044 137/340 |
| 11,304,580 | B2 | * | 4/2022 | Boury .................... | A47L 9/242 |
| 11,844,488 | B2 | * | 12/2023 | Fitzsimmons .......... | A47L 9/248 |
| 2010/0224814 | A1 | * | 9/2010 | Ohlson .................. | F16J 15/062 251/326 |
| 2010/0224815 | A1 | * | 9/2010 | Sidler ................... | F16K 3/0227 251/326 |
| 2020/0329718 | A1 | * | 10/2020 | Hughes, Jr. ........... | F16K 3/0281 |

(Continued)

Primary Examiner — Minh Q Le
(74) Attorney, Agent, or Firm — RABIN & BERDO, P.C.

(57) ABSTRACT

A blast gate has a base and a gate. The base has a main body, a flow channel, a positioning hole, and a gate channel. The gate channel communicates with the flow channel and the gate channel. The gate is inserted in the gate channel and configured to move back and forth in the gate channel to open or close the flow channel. The gate has a board, a positioning tab, and a compensation rib. The positioning tab extends along a first direction from the board, is elastic, and is engageable in the positioning hole along the first direction. The compensation rib protrudes from the board along a second direction opposite to the first direction. When the positioning tab is engaged in the positioning hole, the compensation rib abuts an inner wall around the gate channel so as to push the positioning tab toward the positioning hole.

15 Claims, 11 Drawing Sheets (56) References Cited

U.S. PATENT DOCUMENTS

| | | | |
|---|---|---|---|
| 2021/0207719 A1* | 7/2021 | Lee | F16K 3/0227 |
| 2022/0065354 A1* | 3/2022 | Nguyen | F16K 25/00 |
| 2022/0412468 A1* | 12/2022 | Bailuk | F16K 3/0281 |
| 2023/0194012 A1* | 6/2023 | Heath, Jr. | F16K 27/0218 |
| | | | 134/21 |
| 2023/0219119 A1* | 7/2023 | Sundholm | F16K 27/044 |
| | | | 137/15.06 |
| 2023/0287859 A1* | 9/2023 | Malavasi | F03B 13/08 |
| 2023/0323957 A1* | 10/2023 | Kovacs | F16K 3/316 |
| | | | 251/328 |
| 2024/0360906 A1* | 10/2024 | Holmes | F16K 27/044 |

* cited by examiner

BLAST GATE CAPABLE OF PREVENTING GATE-DROPPING

BACKGROUND OF THE INVENTION

1. Field of the Invention

The present invention relates to a blast gate, and particularly to a blast gate capable of preventing gate-dropping.

2. Description of Related Art

A blast gate is a component in a dust collection system to determine whether a branch pipeline is in use or not. A conventional blast gate is a one-piece molding blast gate and has a base and a gate. The base is formed in one piece and has a flow channel formed therein. The gate is inserted into the base and is movable relative to the base so as to open or close the flow channel. The gate has a positioning tab being elastic, and the base has a positioning hole. To close the flow channel, the positioning tab deforms elastically to be detached from the positioning hole, such that the gate is movable relative to the base. After the flow channel is opened, the positioning tab springs back to its original shape to be engaged in the positioning hole. Thereby, the gate is prevented from dropping from the base.

However, when the gate closes the flow channel, the positioning tab is compressed inside the base. Therefore, the positioning tab may have plastic deformation due to material fatigue and may fail to be engaged in the positioning hole. The gate may thus drop from the base.

To overcome the shortcomings of the conventional blast gate, the present invention tends to provide a blast gate capable of preventing gate-dropping to mitigate or obviate the aforementioned problems.

SUMMARY OF THE INVENTION

The main objective of the present invention is to provide users with a blast gate which ensures its positioning tab to be engaged in the positioning hole after a long-term usage so as to prevent its gate from dropping.

The blast gate capable of preventing gate-dropping has a base and a gate. The base has a main body, a flow channel, at least one positioning hole, and a gate channel. The flow channel is formed in the main body. The at least one positioning hole is formed on the main body. The gate channel is formed in the main body and communicates with the flow channel and the at least one positioning hole. The gate is inserted in the gate channel, is configured to move back and forth in the gate channel to open or close the flow channel, and has a board, at least one positioning tab, and at least one compensation rib. Said positioning tab protrudes from the board along a first direction, is elastic, and is engageable in the at least one positioning hole along the first direction. Said compensation rib protrudes from the board along a second direction opposite to the first direction. When the at least one positioning tab is engaged in the at least one positioning hole, the at least one compensation rib abuts an inner wall around the gate channel so as to push the at least one positioning tab toward the at least one positioning hole.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
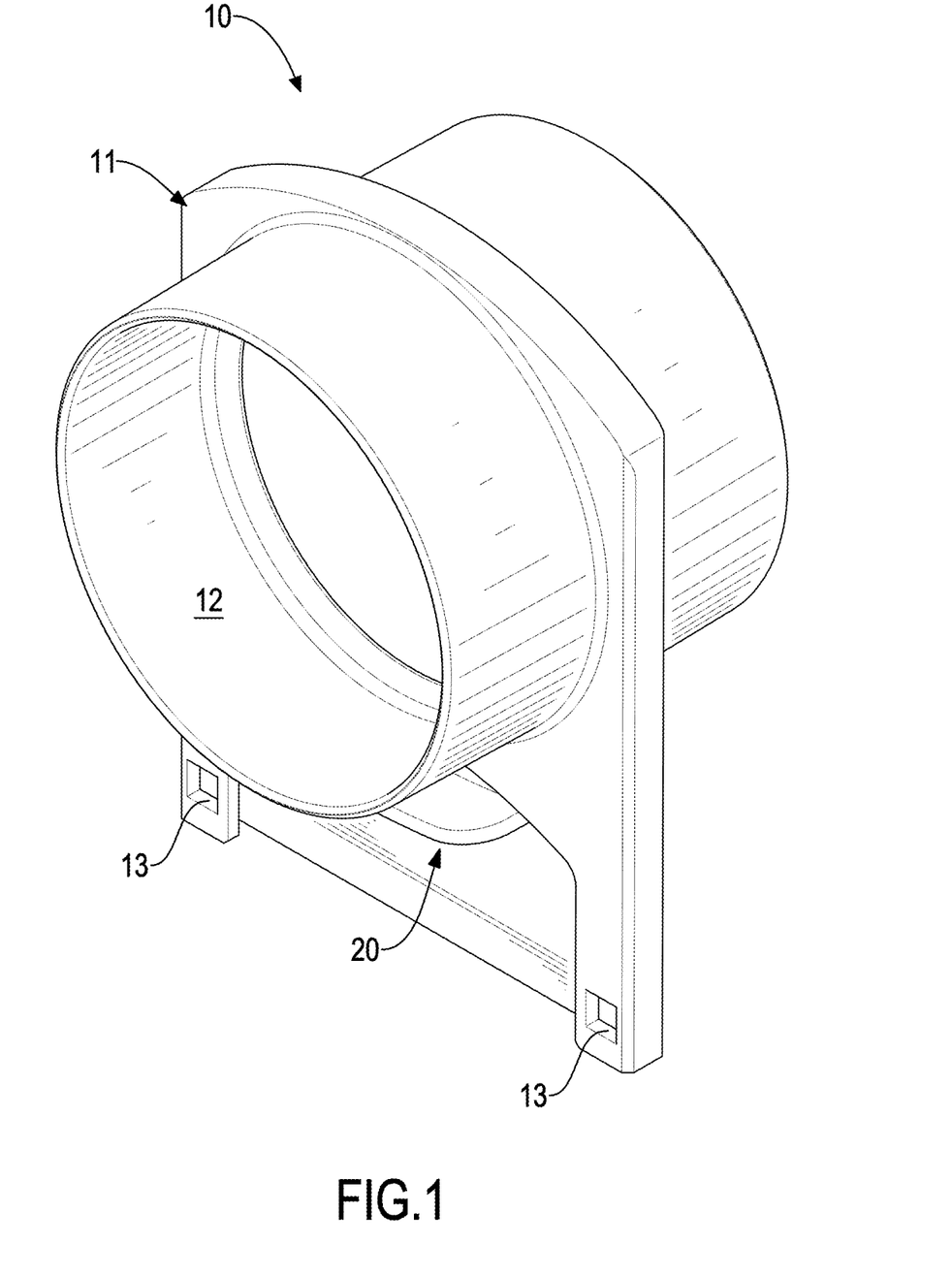
FIG. 1 is a perspective view of a preferred embodiment of a blast gate in accordance with the present invention.
Figure 2:
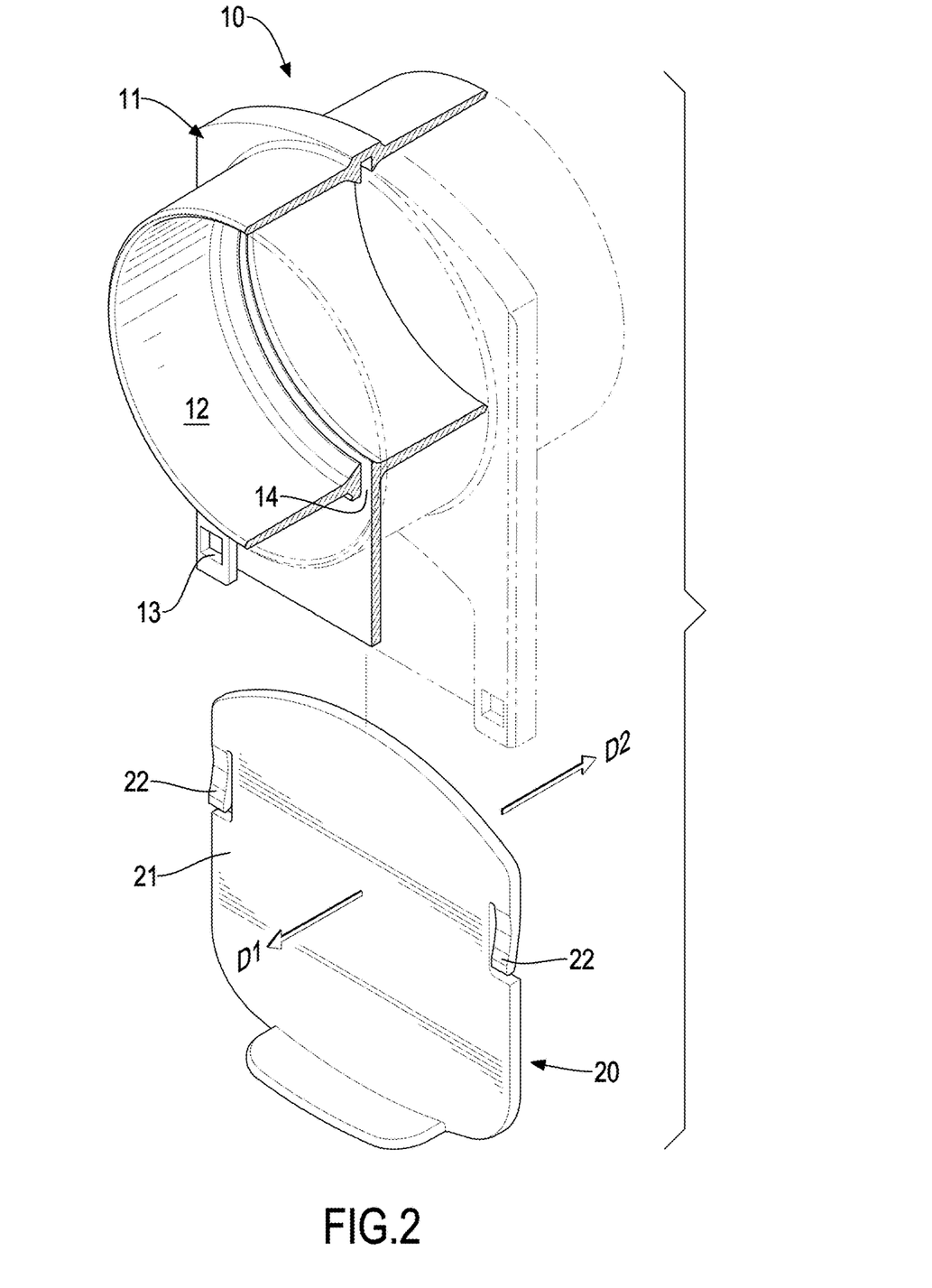
FIG. 2 is an exploded view of the blast gate in FIG. 1 in partial section.
Figure 3:
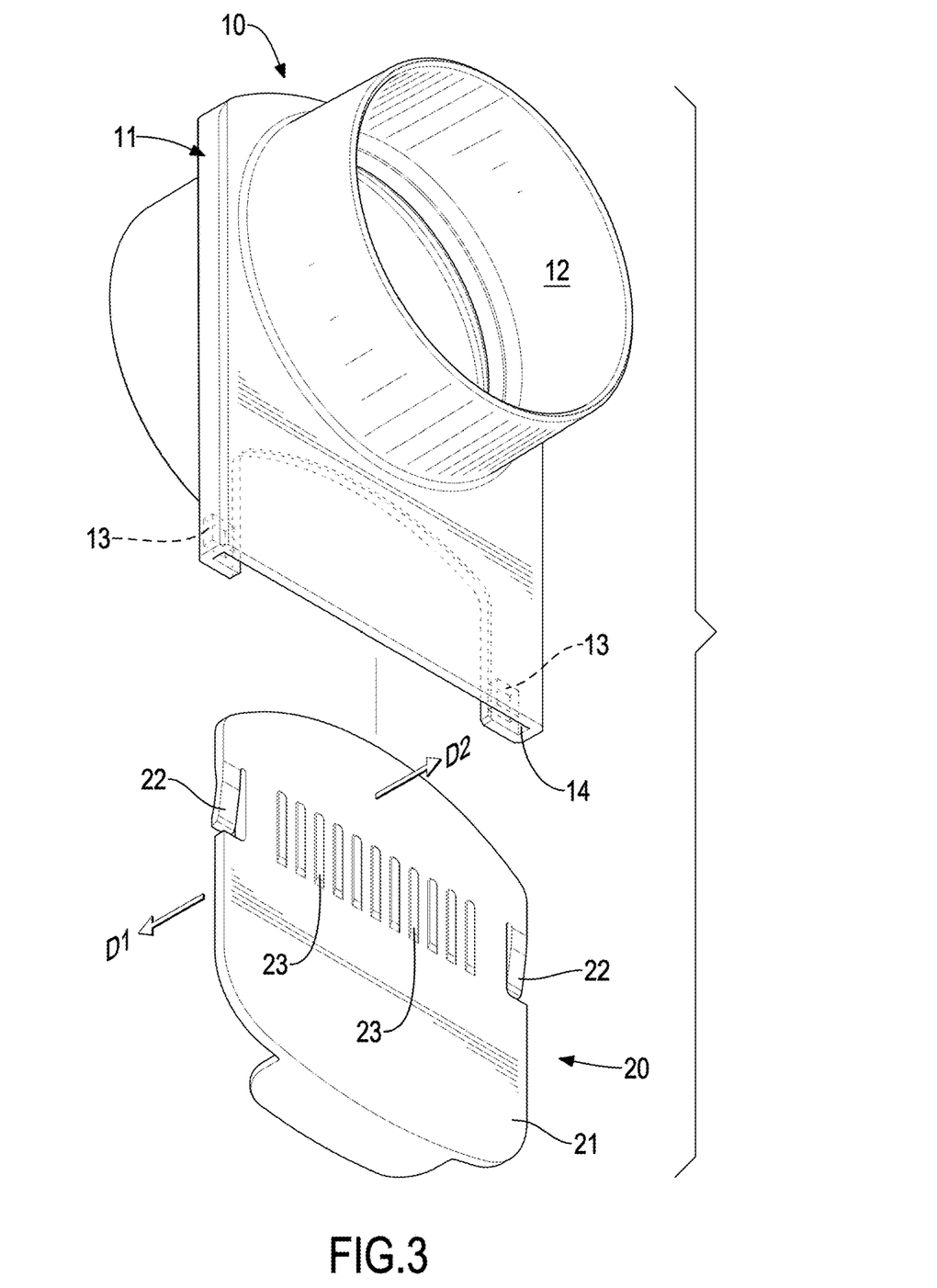
FIG. 3 is an exploded view of the blast gate in FIG. 1 viewed from another angle.

With reference to FIGS. 1 to 3, a preferred embodiment of a blast gate in accordance with the present invention has a base 10 and a gate 20. The base 10 has a flow channel 12 configured for air to flow through with dirt and saw dust. The gate 20 is disposed to the base 10 and is configured to move relative to the base 10 so as to open or close the flow channel 12. Thereby, the blast gate can be disposed between a branch pipeline and a main pipeline of a dust collection system to manage dust collection.

With reference to FIGS. 2 to 5, the base 10 has a main body 11, the flow channel 12, at least one positioning hole 13, and a gate channel 14. In the preferred embodiment, the main body 11 is made of plastic material and formed in one piece. In other embodiments, the main body 11 may be made of other material such as metal or wood and may be formed by other process, which is not limited to the preferred embodiment. The flow channel 12 and the gate channel 14 are formed in the main body 11, and the at least one positioning hole 13 is formed on the main body 11. The gate channel 14 is configured for the gate 20 to be disposed therein, and the gate channel 14 communicates with the flow channel 12 and the at least one positioning hole 13.

With reference to FIGS. 2 and 3, the gate 20 has a board 21, at least one positioning tab 22, and at least one compensation rib 23. The at least one positioning tab 22 and the at least one compensation rib 23 are disposed on the board 21. Said positioning tab 22 extends along a first direction D1 from the board 21. Said compensation rib 23 protrudes from the board 21 along a second direction D2, wherein the second direction D2 is opposite to the first direction D1. With reference to FIGS. 1 and 6 to 8, the gate 20 is movably inserted into the base 10. Said positioning tab 22 is elastic and can be engaged in said positioning hole 13 after the gate 20 moves relative to the base 10. Thereby, the gate 10 and the base 20 are fixed with respect to each other.

Figure 9:
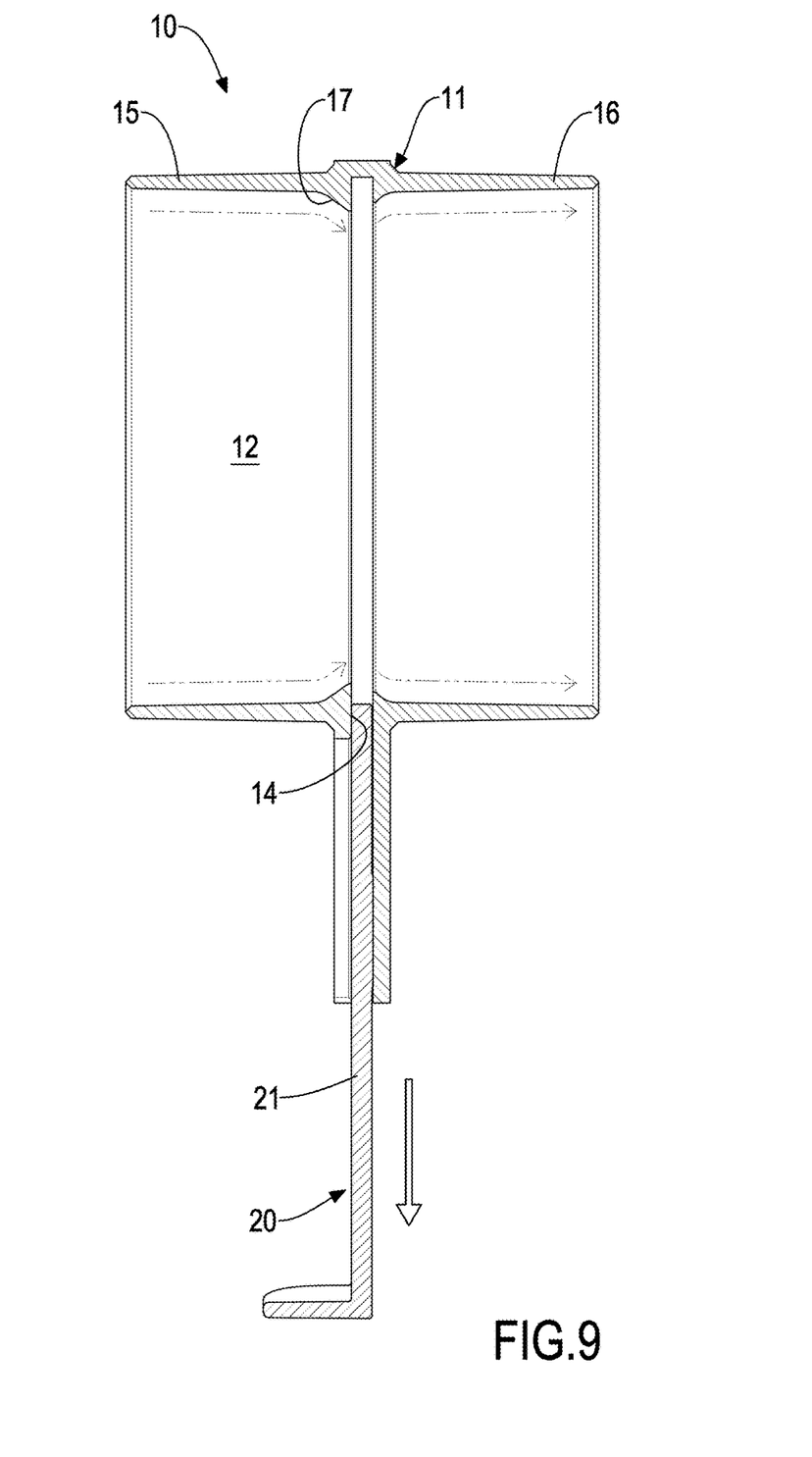
FIG. 9 is a sectional view across line 9-9 in FIG. 8.

With reference to FIG. 9, specifically, the gate 20 is inserted into the gate channel 14. The gate channel 14 extends into a middle section of the flow channel 12, and the gate 20 is configured to move back and forth in the gate channel 14. Therefore, with reference to FIG. 6, the gate 20 may move in the middle section of the flow channel 12 to obstruct and close the flow channel 12, or depart from the middle section of the flow channel 12 to open the flow channel 12.

Figure 7:
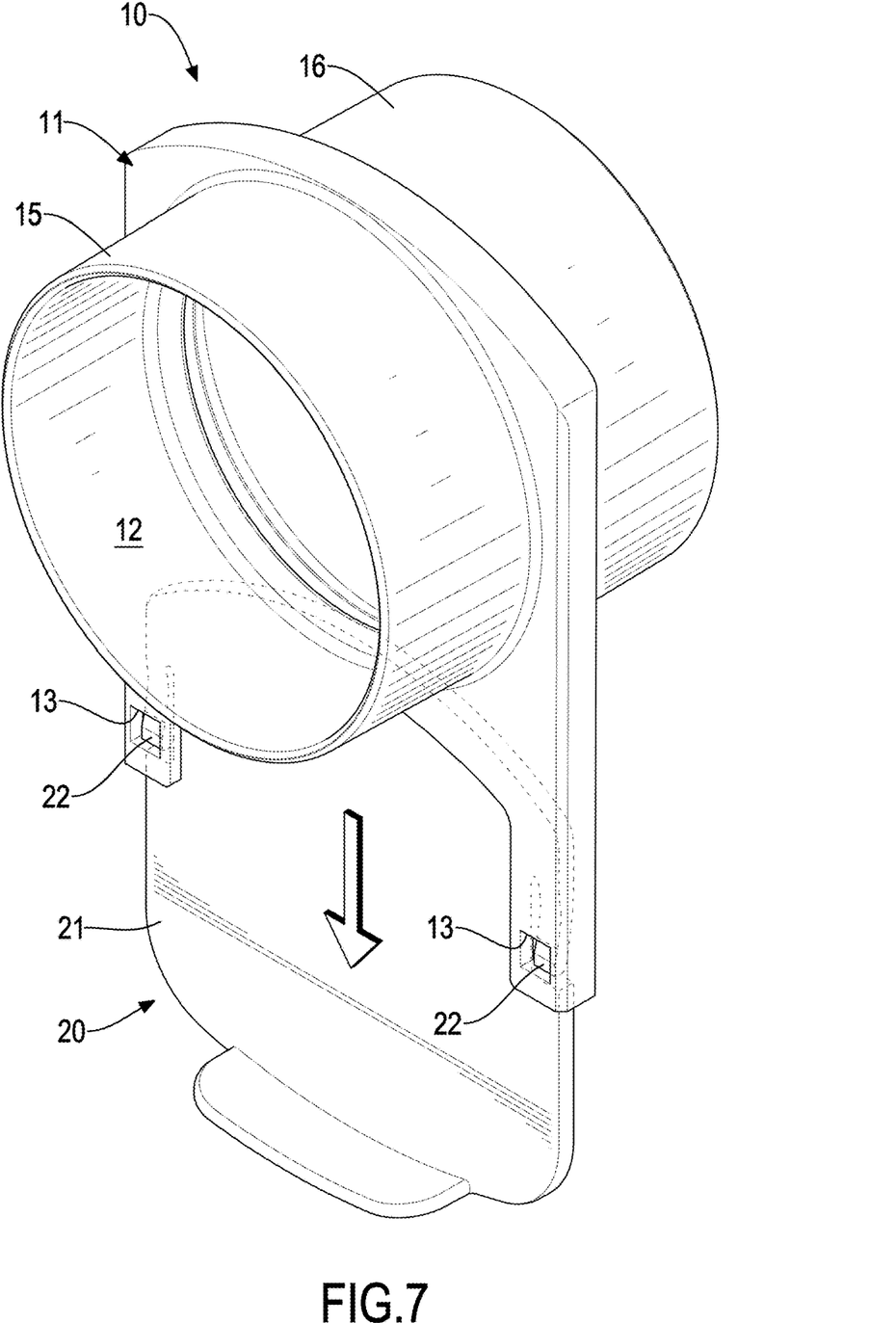
FIG. 7 is an operational view of the blast gate in FIG. 1 opening a flow channel.
Figure 8:
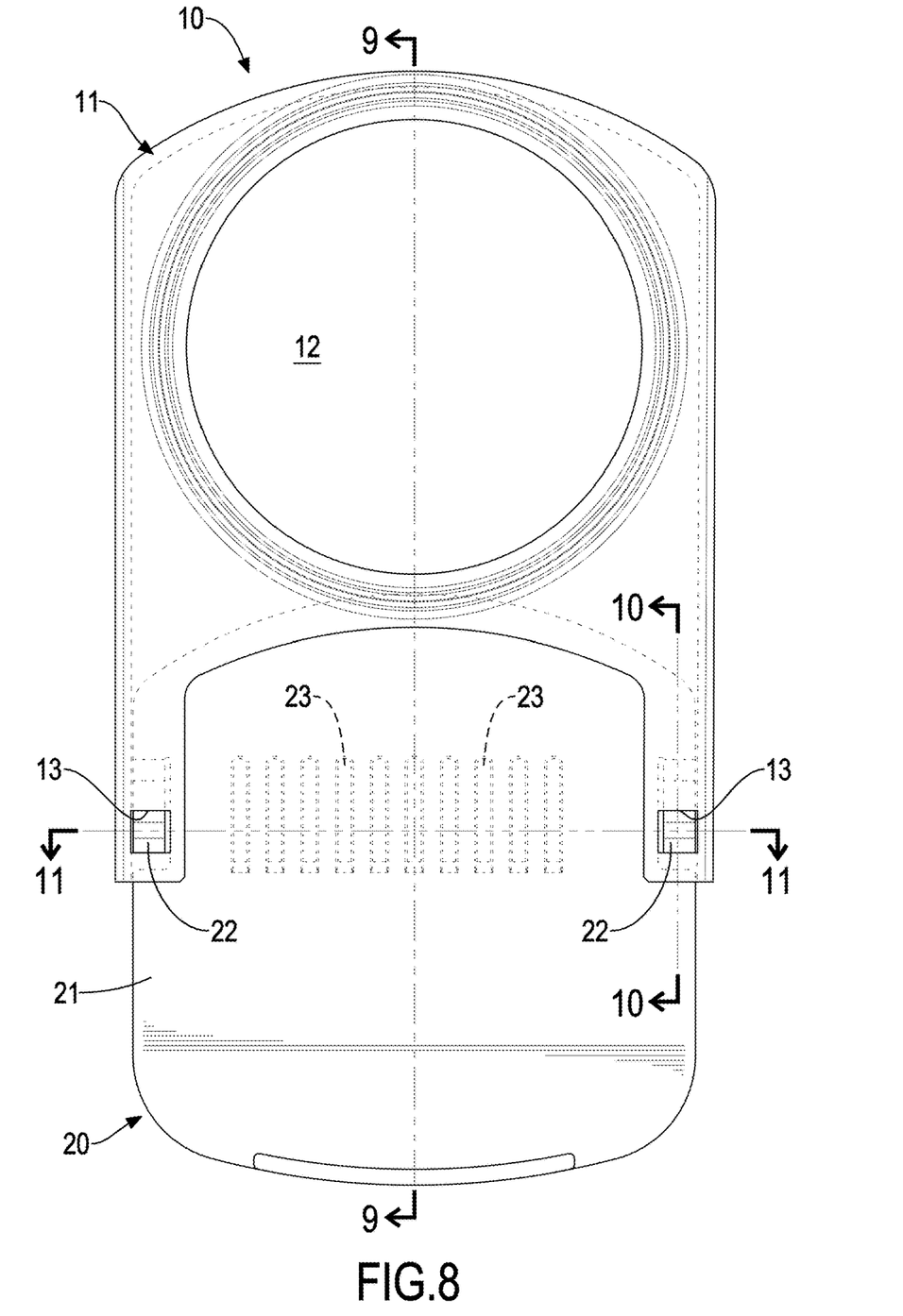
FIG. 8 is a front side view of the blast gate in FIG. 1 after the flow channel is opened.
Figure 10:
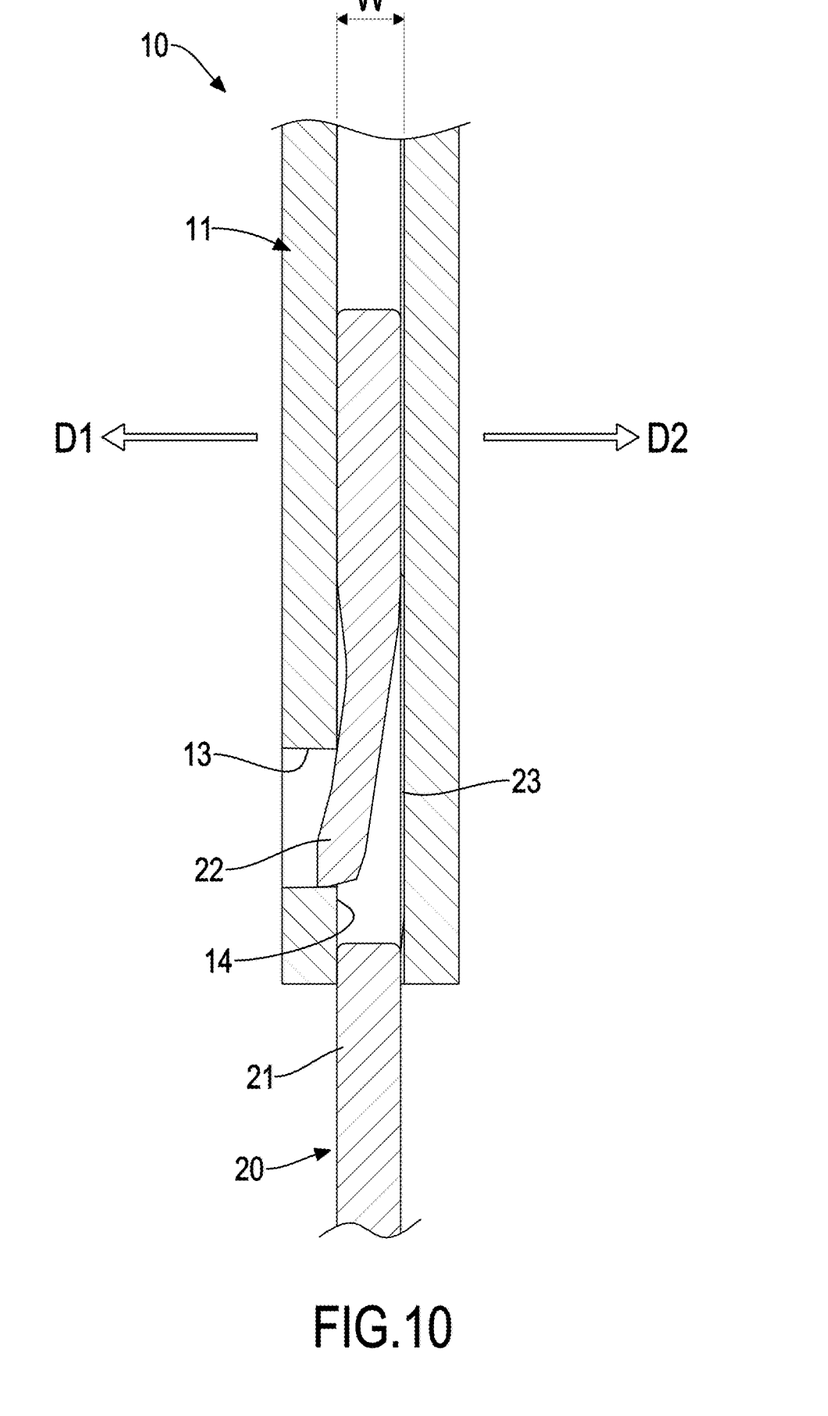
FIG. 10 is a sectional view across line 10-10 in FIG. 8.
Figure 11:
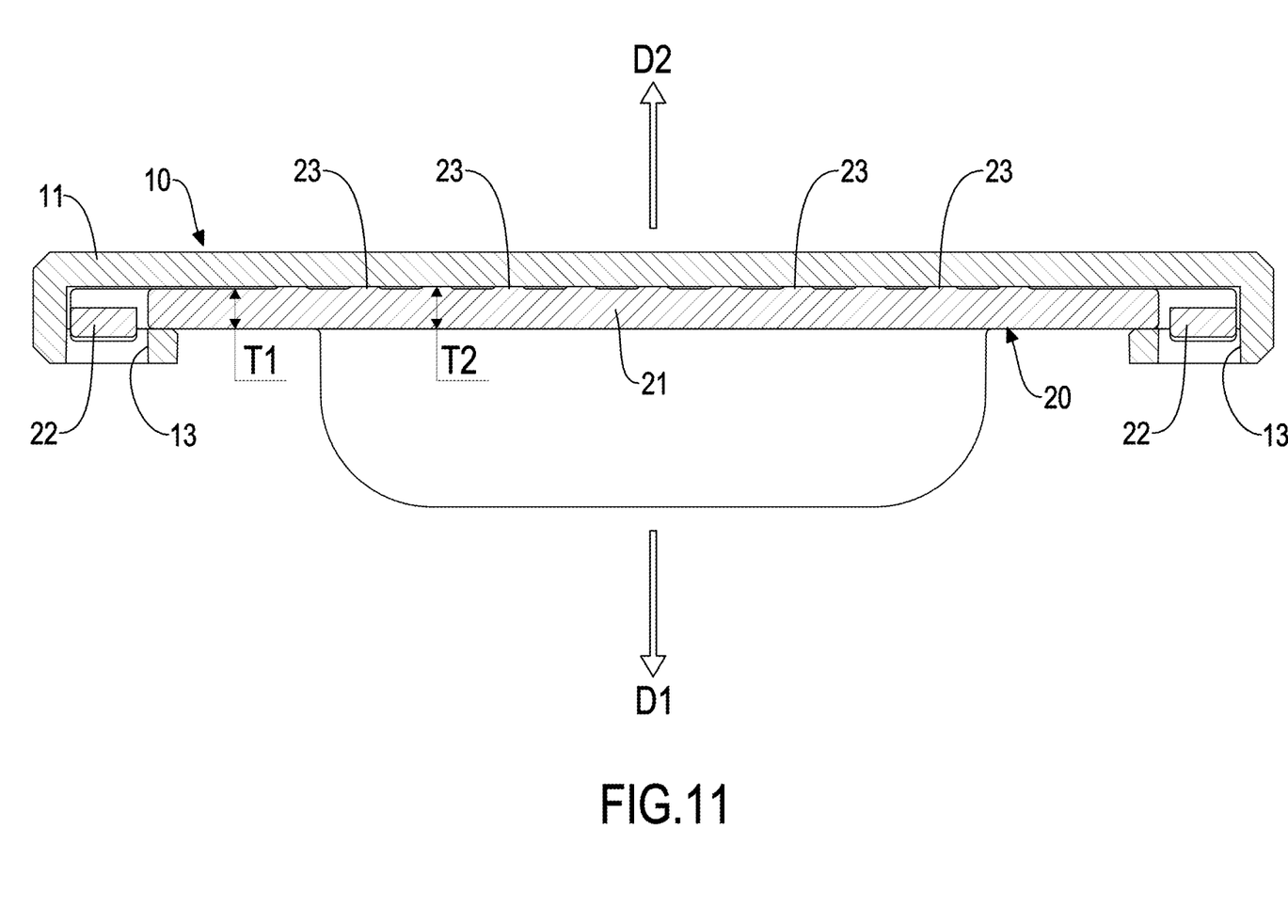
FIG. 11 is a sectional view across line 11-11 in FIG. 8.

With reference to FIGS. 7, 8, and 10, when the gate 20 opens the flow channel 12, said positioning tab 22 is engaged in said positioning hole 13 along the first direction D1. With reference to FIGS. 10 and 11, when said positioning tab 22 is engaged in said positioning hole 13, said compensation rib 23 abuts an inner wall around the gate channel 14, also regarded as a portion of the main body 11, so as to push said positioning tab 22 toward said positioning hole 13.

In a specific usage, when trying to isolate said branch pipeline from the main pipeline of the dust collection system, a user may push the gate 20 toward an interior of the base 10. At the time, said positioning tab 22 is compressed by the main body 11 and deforms elastically along the second direction D2, such that said positioning tab 22 is detached from said positioning hole 13 and is compressed inside the gate channel 14. Thus, the gate 20 is configured to move along the gate channel 14 and into the middle section of the flow channel 12 so as to close the flow channel 12.

When trying to have said branch pipeline and the main pipeline communicate with each other, the user may pull the gate 20 from the interior of the base 10. With reference to FIG. 9, the gate 20 then moves along the gate channel 14 to depart from the middle section of the flow channel 12. When said positioning tab 22 moves toward and is aligned with said positioning hole 13, with reference to FIG. 10, said positioning tab 22 springs back to its original form and is re-engaged in said positioning hole 13 along the first direction D1. The gate 20 and the base 10 are thus fixed with each other to prevent the gate 20 from dropping.

Since the gate 20 usually closes the flow channel 12, said positioning tab 22 is compressed inside the gate channel 14 for a long time and may have plastic deformation due to material fatigue. Hence, the blast gate in accordance with the present invention has said compensation rib 23. When said positioning tab 22 is engaged in said positioning hole 13 along the first direction D1, said compensation rib 23 abuts the main body 11 of the base 10, more specifically the inner wall around the gate channel 14, along the opposite second direction D2. Thereby, said positioning tab 22 is pushed toward said positioning hole 13, and a distance of said compensation rib 23 protruding along the second direction D2 may compensate the plastic deformation of said positioning tab 22. Since the plastic deformation of said positioning tab 22 is limited by a shape of said positioning tab 22 and in a specific value, the protruding distance of said compensation rib 23 can be larger than the plastic deformation of said positioning tab 22 to ensure said positioning tab 22 to be engaged in said positioning hole 13.

The blast gate in accordance with the present invention has said compensation rib 23 on the gate 20 to compensate the plastic deformation of said positioning tab 22 due to fatigue. Even after long-term use, said positioning tab 22 is ensured to be engaged in said positioning hole 13 to fix the base 10 and the gate 20 when the gate 20 opens the flow channel 12 in the base 10. Thereby, the blast gate prevents the gate 20 from dropping from the base 10 without adding any extra component and may have a longer service life.

In the preferred embodiment, the first direction D1 and the second direction D2 are two directions toward which two opposite surfaces of the board 21 face. With reference to FIGS. 10 and 11, the gate channel 14 has a width W, and the board 21 of the gate 20 has a board thickness T1. A sum of the board thickness T1 and a distance of said compensation rib 23 protruding from the board 21 is equal to a gate thickness T2. The gate thickness D2 is shorter than or equal to the width W of the gate channel 14.

Figure 6:
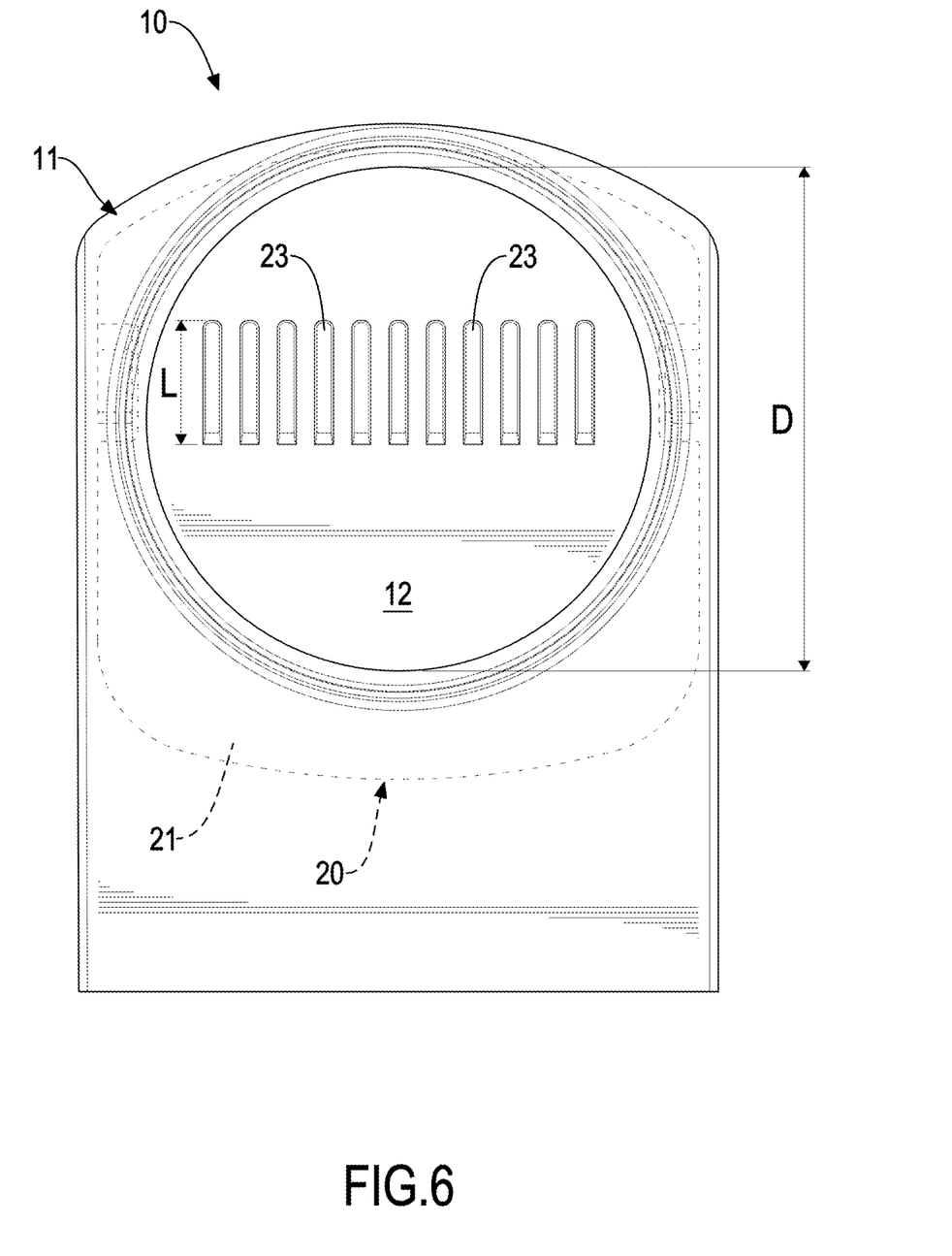
FIG. 6 is a rear side view of the blast gate in FIG. 1.

Further, with reference to FIG. 6, when the gate 20 moves along the gate channel 14 to obstruct and close the middle section of the flow channel 12, said compensation rib 23 is located in the flow channel 12 and spaced from the main body 11 of the base 10. Thereby, when said positioning tab 22 is compressed inside the gate channel 14 while the gate 20 is closing the flow channel 12, said compensation rib 23 does not abut the main body 11 of the base 10. With this configuration, said compensation rib 23 may not increase pressure of said positioning tab 22 during compression, and may be prevented from accelerating the plastic deformation of said positioning tab 22.

Figure 5:
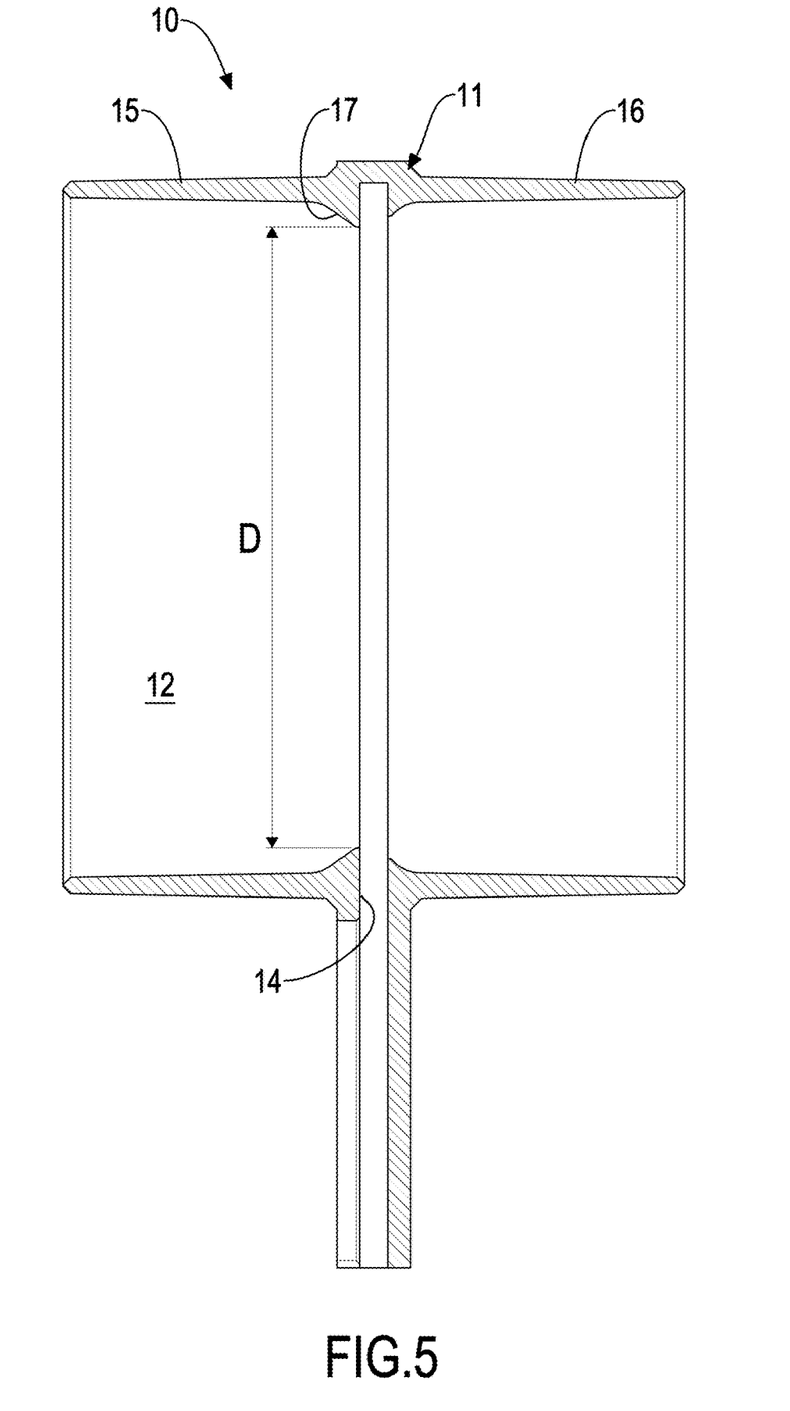
FIG. 5 is a sectional side view of the base in FIG. 4.

Specifically, with reference to FIGS. 5 and 6, said compensation rib 23 extends along said surface of the board to be strip-shaped and have a length L. The flow channel 12 has a diameter D at a position having the smallest cross-sectional area. The length L of said compensation rib 23 is smaller than the diameter D at the smallest cross-sectional area of the flow channel 12, which ensures that said compensation rib 23 is completely located in the flow channel and spaced from the main body 11 of the base 10.

Furthermore, with reference to FIGS. 8 and 9, when said positioning tab 22 is engaged in said positioning hole 13, the gate 20 completely departs from the flow channel 12. By appropriate designs of positions of said positioning hole 13 and said positioning tab 22, and a dimension of the gate 20, when being fixed with the base 10, the gate 20 completely departs from the flow channel 12. Thence, air flow through the flow channel 12 is prevented from being turbulent due to interference of the gate 20, and dirt, dust, or sawdust with the air are less likely to drop inside the base 10. The configuration is beneficial to cleanliness inside the base 10.

In addition, with reference to FIGS. 3, 8, and 11, said compensation rib 23 and said positioning tab 22 are disposed at a same height position on the board 21. Thus, when said compensation rib 23 abuts the inner wall around the gate channel 14, said positioning tab 22 is pushed exactly along the first direction D1 and ensured to be engaged in said positioning hole 13 along the first direction D1. Compensation by said compensation rib 23 can be prevented from deflection.

Preferably, with reference to FIGS. 2, 3, and 11, the base 10 has two said positioning holes 13, and the gate 20 has two said positioning tabs 22 and multiple compensation ribs 23. The two positioning holes 13 are respectively located near two opposite sides of the base 10. The two positioning tabs 22 are respectively located on two opposite sides of the board 21 and configured to be respectively engaged in the two positioning holes 13. The two positioning holes 13 and the two positioning tabs 22 may improve stability of positioning.

With reference to FIGS. 2, 3, and 11, the multiple compensation ribs 23 are arranged between the two opposite sides of the base 10 at spaced intervals. Therefore, the multiple compensation ribs 23 provide their compensation efficacy equally to the two positioning tabs 22, and thus the gate 20 is less likely to be deflected. Additionally, when the gate 20 moves back and forth in the gate channel 14, friction forces between the multiple compensation ribs 23 and the main body 11 of the base 10 can be distributed equally. Hence, the gate 20 is also prevented from deflection during moving.

In the preferred embodiment, the gate 20 has the two positioning tabs 22 and the multiple compensation ribs 23, and each one of the multiple compensation ribs 23 extends on said surface along a direction of the gate channel 14 to be strip-shaped. In other embodiments, a number and a shape of said compensation rib 23 are not limited in the preferred embodiment. As long as said compensation rib 23 protrudes from the board 21 along the second direction D2 and abuts the inner wall around the gate channel 14 along the second direction D2 when said positioning tab 22 is engaged in said positioning hole 13 along the first direction D1, said compensation rib 23 provides the efficacy of compensating the plastic deformation of said positioning tab 22 in accordance with the present invention.

Figure 4:
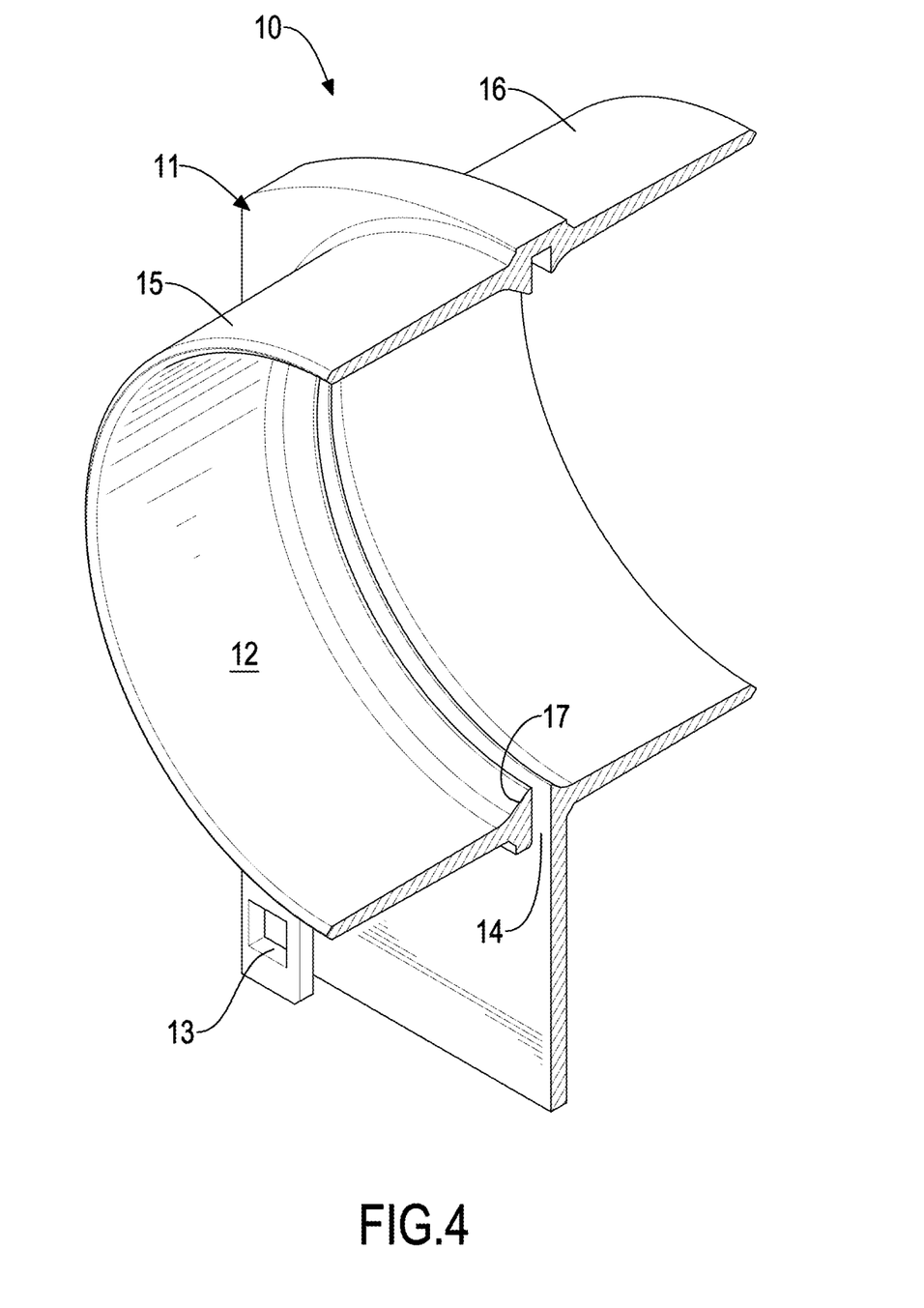
FIG. 4 is a cross sectional perspective view of a base of the blast gate in FIG. 1.

Preferably, with reference to FIGS. 4, 5, and 9, the main body 11 of the base 10 has an inlet tube 15 and an outlet tube 16. The inlet tube 15 and the outlet tube 16 are disposed coaxially, and the flow channel 12 is surrounded by the inlet tube 15 and the outlet tube 16. The inlet tube 15 has an annular edge 17 protruding from an inner peripheral surface of the inlet tube 15 and located on an end of the inlet tube 15 near the outlet tube 16. By the annular edge 17 protruding inward, a portion of the inlet tube 15 near the outlet tube 16 has a smaller cross-sectional area. Thereby, air flowing from the inlet tube 15 to the outlet tube 16 with dirt, dust, and sawdust has a higher flow speed, which prevents dirt, dust, and sawdust from dropping inside the base 10 and interfering with operation of the gate 20.

More preferably, the annular edge 17 tapers toward the outlet tube 16. By the tapering annular edge 17, flow speed of air from the inlet tube 15 to the outlet tube 16 is increased smoothly and stably. The annular edge 17 neither disturbs air nor blocks dirt, dust, and sawdust with air. Dirt, dust, and sawdust are less likely to stay in the inlet tube 15. Thereby, the base 10 may have a longer cleaning and maintenance period, and cost of maintenance of the base 10 can be lowered.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A blast gate capable of preventing gate-dropping, the blast gate comprising:
    a base comprising
        a main body;
        a flow channel formed in the main body;
        at least one positioning hole formed on the main body; and
        a gate channel formed in the main body and communicating with the flow channel and the at least one positioning hole; and
    a gate inserted in the gate channel of the base, configured to move back and forth in the gate channel to open or close the flow channel, and comprising
        a board;
        at least one positioning tab protruding from the board along a first direction, being elastic, and being engageable in the at least one positioning hole along the first direction; and
        at least one compensation rib protruding from the board along a second direction being opposite to the first direction;
    wherein when the at least one positioning tab is engaged in the at least one positioning hole, the at least one compensation rib abuts an inner wall around the gate channel so as to push the at least one positioning tab toward the at least one positioning hole.

2. The blast gate as claimed in claim 1, wherein when the gate closes the flow channel, the at least one compensation rib is located in the flow channel and spaced from the main body of the base.

3. The blast gate as claimed in claim 1, wherein when the at least one positioning tab is engaged in the at least one positioning hole, the gate completely departs from the flow channel.

4. The blast gate as claimed in claim 1, wherein the at least one compensation rib and the at least one positioning tab are disposed at a same height position on the board.

5. The blast gate as claimed in claim 2, wherein the at least one compensation rib and the at least one positioning tab are disposed at a same height position on the board.

6. The blast gate as claimed in claim 3, wherein the at least one compensation rib and the at least one positioning tab are disposed at a same height position on the board.

7. The blast gate as claimed in claim 4, wherein
    the base has two said positioning holes;
    the gate has multiple compensation ribs and two positioning tabs;
    the two positioning tabs are respectively disposed on two opposite sides of the board and configured to be engaged in the two positioning holes; and
    the multiple compensation ribs are arranged at spaced intervals between the two sides of the board.

8. The blast gate as claimed in claim 5, wherein
    the base has two said positioning holes;
    the gate has multiple compensation ribs and two positioning tabs;
    the two positioning tabs are respectively disposed on two opposite sides of the board and configured to be engaged in the two positioning holes; and
    the multiple compensation ribs are arranged at spaced intervals between the two sides of the board.

9. The blast gate as claimed in claim 6, wherein
    the base has two said positioning holes;
    the gate has multiple compensation ribs and two positioning tabs;
    the two positioning tabs are respectively disposed on two opposite sides of the board and configured to be engaged in the two positioning holes; and
    the multiple compensation ribs are arranged at spaced intervals between the two sides of the board.

10. The blast gate as claimed in claim 1, wherein
    the base has an inlet tube and an outlet tube;
    the flow channel is surrounded by the inlet tube and the outlet tube;
    the inlet tube has an annular edge protruding from an inner peripheral surface of the inlet tube and located on an end of the inlet tube near the outlet tube.

11. The blast gate as claimed in claim 2, wherein
    the base has an inlet tube and an outlet tube;
    the flow channel is surrounded by the inlet tube and the outlet tube;
    the inlet tube has an annular edge protruding from an inner peripheral surface of the inlet tube and located on an end of the inlet tube near the outlet tube.

12. The blast gate as claimed in claim 3, wherein
    the base has an inlet tube and an outlet tube;
    the flow channel is surrounded by the inlet tube and the outlet tube;
    the inlet tube has an annular edge protruding from an inner peripheral surface of the inlet tube and located on an end of the inlet tube near the outlet tube.

13. The blast gate as claimed in claim 10, wherein the annular edge tapers toward the outlet tube.

14. The blast gate as claimed in claim 11, wherein the annular edge tapers toward the outlet tube.

15. The blast gate as claimed in claim 12, wherein the annular edge tapers toward the outlet tube.

* * * * *